UNITED STATES PATENT OFFICE.

FREDERICK LAIST AND FREDERICK F. FRICK, OF ANACONDA, MONTANA.

PROCESS OF EXTRACTING ZINC FROM ITS ORES.

1,167,700.  Specification of Letters Patent.  Patented Jan. 11, 1916.

No Drawing.  Application filed August 13, 1915.  Serial No. 45,361.

*To all whom it may concern:*

Be it known that we, FREDERICK LAIST and FREDERICK F. FRICK, citizens of the United States, residing at Anaconda, in the county of Deerlodge and State of Montana, have invented certain new and useful Improvements in Processes of Extracting Zinc from its Ores, of which the following is a specification.

This invention relates to the hydrometallurgical treatment of zinc ores, and is especially adapted to the treatment of so-called complex sulfid ores which are not readily amenable to treatment by the usual processes.

The object of the invention is the provision of a cyclical process by which zinc may be economically extracted from ores in which it exists in association with other metals, as lead, iron, copper, silver, gold, etc. The proper performance of the cycle depends upon the presence of manganese, which may be present in sufficient proportion as a normal constituent of the ore, or which may be added to the raw ore or concentrates, preferably as manganese carbonate or sulfid or in other inexpensive form, the addition being made either on starting or after the operation has been established. The function of the manganese is to serve as a carrier of oxygen for the oxidation of ferrous to ferric iron, thus rendering possible a complete separation of iron, and affording a purified solution from which zinc may be recovered by electrolysis. In the course of this electrolysis the manganese is restored to a state of oxidation higher than the manganous state, and thereby becomes available for re-use in the process.

In the present process the oxidation of the sulfid ores is accomplished by roasting, and the manganese, in its higher state of oxidation, reënters the cycle subsequent to the roasting operation; and is therefore not subjected to the reducing action of the sulfid ores. This presents the advantages that the manganese may be originally introduced into the cycle with the raw ore and in inexpensive forms, and that the requirement of manganese in its higher states of oxidation is limited to the equivalent of the ferrous iron to be oxidized, with such additional quantities as may be needed to compensate losses and to insure completeness of the reaction. In some cases at least the normal manganese content of the zinc ores will suffice for the purposes of this invention.

A typical embodiment of the process is as follows:

*Roasting.*—The zinc ore, or concentrates from the ore, is roasted under suitable conditions of time and temperature to render the maximum amount of zinc soluble in dilute sulfuric acid. Some of the roasting reactions are:

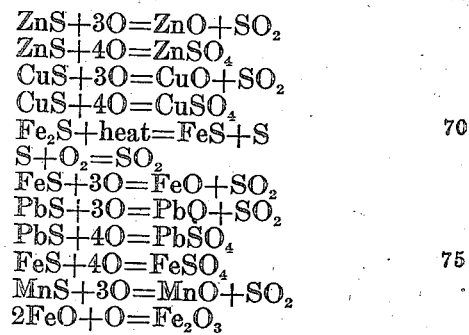

*Leaching.*—The calcined ore or concentrates is treated at a temperature of 50 to 65° C. with sufficient dilute sulfuric acid so that there is 5 per cent. to 10 per cent. excess acid over that required to complete the reactions, by which the metals in the calcined ore are dissolved:

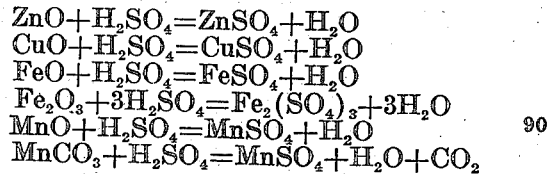

The normal sulfates of the above metals are soluble in water.

As will be observed, a portion of the iron enters into solution as a ferrous salt, in which state it is not completely removed by the usual basic precipitants, (lime, zinc oxid, etc.) It is necessary therefore to oxidize this ferrous iron, and in the cyclic operation of the process this is accomplished through the agency of the manganese, which enters the cycle at this point in one of its higher states of oxidation, as for instance in the form of manganese dioxid, permanganic acid, and possibly other states of oxidation higher than the manganous state, the manganese compounds being either in solution or in suspension, or both, according as they are soluble or insoluble in the acid solution. In these higher states of oxidation it is a product of the electrolytic stage of the process. The oxidation of the ferrous sulfate takes place according to the equation:

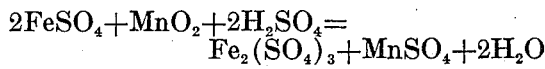

Having accomplished the leaching and having a slight excess of acid in solution, sufficient milk of lime or zinc oxid is added to render the solution neutral or slightly basic. The iron and most of the other impurities except copper are precipitated, and the precipitated impurities are so coagulated that filtration is very rapid:

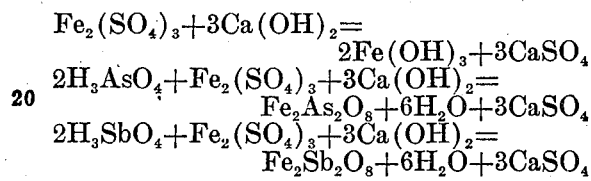

*Removal of copper.*—The resultant solution now contains zinc, manganese and copper sulfates with possibly small amounts of silver, arsenic, antimony, etc. The copper and traces of other impurities are removed by treatment with metallic zinc, preferably zinc dust:

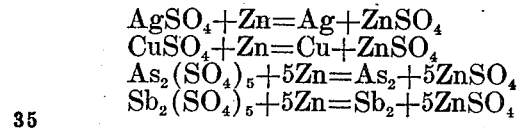

The insoluble residues of the calcines and the precipitated impurities may be separated from the solution by setting and decantation or by filtration.

*Electrolysis.*—The solution thus purified from elements harmful to electrolysis is subjected to electrolysis using insoluble anodes, as lead for example, and suitable deposition blanks or zinc starting sheets for cathodes. The principal products of electrolysis are metallic zinc, sulfuric acid, manganese dioxid and permanganic acid.

$$ZnSO_4 + current = Zn + SO_4$$
$$SO_4 = SO_3 + O$$
$$SO_3 + H_2O = H_2SO_4$$

It is the above oxygen liberated from the $SO_4$ at the anode which effects the oxidation of the manganese.

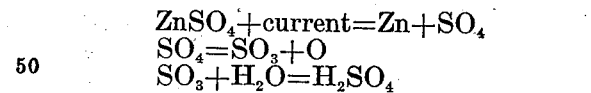

It is apparent from the above that a regenerated sulfuric acid solution containing manganese in higher stages of oxidation than the manganous state, results, and is directly available for leaching additional portions of roasted ore, where the higher oxids of manganese are available for oxidation of ferrous iron and are themselves reduced to manganous sulfate, thus making a cyclic process in which the desirable manganese may be used over and over again, and in which the original supply or any deficiency may be supplied to the raw zinc ore or concentrates in the form of carbonate or sulfid ores of manganese.

An essential feature of the process is the regeneration of the oxidizing agent, and its reëntry into the cycle at a point subsequent to the elimination of sulfur from the ores. In the typical embodiment of the invention the manganese is introduced into the process as sulfid (MnS) or carbonate ($MnCO_3$); is converted to the sulfate; is eventually oxidized by electrolysis to higher states of oxidation; and repeatedly reënters the cycle at the leaching stage in which a reduction to sulfate occurs to the extent that ferrous iron may be present in the solutions at this point.

The term "ore" is used herein to include raw zinc ores, concentrates therefrom, and in general such zinc products as are amenable to the process. The term "oxidized ore" is used to designate ores, including roasted sulfid ores, in which the zinc is present as an oxid or in an oxygen-containing compound.

We claim:—

1. A cyclical process of extracting zinc from oxidized ores thereof containing iron, which consists in leaching the ore with dilute sulfuric acid, oxidizing the ferrous sulfate by means of a manganese compound in a state of oxidation higher than the manganous state, precipitating the ferric iron, electrolytically depositing the zinc from the purified solution with insoluble anodes, and utilizing the resulting acid solution containing manganese in its higher states of oxidation for the extraction of zinc from additional portions of the ore.

2. In a cyclical process of extracting zinc from oxidized ores thereof, the steps which consist in electrolyzing, with insoluble anodes, a solution containing salts of zinc and manganese, depositing the zinc in metallic state, and utilizing the resulting acid solution containing oxidized compounds of manganese for the extraction of zinc from its oxidized ores.

3. A process of extracting zinc from sulfid ores thereof containing iron, which consists in roasting the sulfid ore in presence of a manganese compound, leaching the ore with dilute sulfuric acid, oxidizing the ferrous iron and precipitating the ferric iron, electrolytically depositing the zinc from the purified solution with insoluble anodes, and utilizing the resulting acid solution containing manganese in its higher states of oxidation for the extraction of zinc from additional portions of roasted ore.

4. A process of extracting zinc from oxidized ores thereof containing iron, which consists in leaching the ore with an acid reagent, oxidizing the dissolved ferrous salt and precipitating the ferric iron, electrolytically depositing the zinc from the purified solution with insoluble anodes in presence of a manganese salt, and utilizing the resulting acid solution containing manganese in its higher states of oxidation for the extraction of zinc from additional portions of the ore.

5. In a process of extracting zinc from oxidized ores thereof containing iron, the steps which consist in leaching the ore with an acid solution containing manganese in a state of oxidation higher than the manganous state, whereby the ferrous iron is converted to the ferric state, precipitating the ferric iron, reoxidizing the manganese compound, and utilizing the same for the extraction of zinc from additional portions of the ore.

6. In a process of treating oxidized ores of zinc, the step which consists in electrolyzing with insoluble anodes a solution containing salts of zinc and of manganese, and simultaneously depositing metallic zinc and producing an acid solution containing manganese compounds in a state of oxidation higher than the manganous state.

In testimony whereof, we affix our signatures in presence of two witnesses.

FREDERICK LAIST.
FREDERICK F. FRICK.

Witnesses:
  C. B. CLYNE,
  MARTIN MARTIN.